United States Patent
Zhu et al.

(10) Patent No.: US 8,138,699 B2
(45) Date of Patent: Mar. 20, 2012

(54) POWER CONTROL SYSTEM FOR VEHICLE DISK MOTOR

(75) Inventors: Shengbo Zhu, San Jose, CA (US); Su Shiong Huang, Bellevue, WA (US)

(73) Assignee: Silicon Valley Micro M Corp., San Jose, CA (US)

( * ) Notice: Subject to any disclaimer, the term of this patent is extended or adjusted under 35 U.S.C. 154(b) by 379 days.

(21) Appl. No.: 12/589,916

(22) Filed: Oct. 30, 2009

(65) Prior Publication Data
US 2011/0101901 A1    May 5, 2011

(51) Int. Cl.
*H02P 23/14* (2006.01)

(52) U.S. Cl. ......... 318/400.14; 318/400.13; 318/400.01; 318/700

(58) Field of Classification Search ............. 318/400.14, 318/400.13, 400.01, 700
See application file for complete search history.

(56) References Cited

U.S. PATENT DOCUMENTS
5,552,988 A * 9/1996 Kawaguchi et al. ............ 701/70

OTHER PUBLICATIONS

Application Note AVR:443 entitled "Sensor-based control of three phase Brushless DC motor" published by Atmel Corporation of San Jose, California, Feb. 2006.

* cited by examiner

*Primary Examiner* — Walter Benson
*Assistant Examiner* — David Luo

(57) ABSTRACT

A brushless D.C. disk motor has one or more disk rotor assemblies and pairs of stator assemblies for each rotor assembly. Each disk rotor assembly has a disk and a plurality of permanent magnets distributed along two or more circular paths in the disk inboard of the peripheral edge of the rotor. Each stator assembly has a plurality of pole pieces and coils distributed along a mounting plate in corresponding circular paths. The disk is rotatably mounted to a support member; while the stator sub-assemblies are fixed to the support member. The coils are selectively activated by commutated power control signals generated in response to a vehicle condition parameter, such as vehicle speed or disk motor load, to optimize power drain from the source of electrical power in accordance with the value of the vehicle condition parameter.

16 Claims, 13 Drawing Sheets

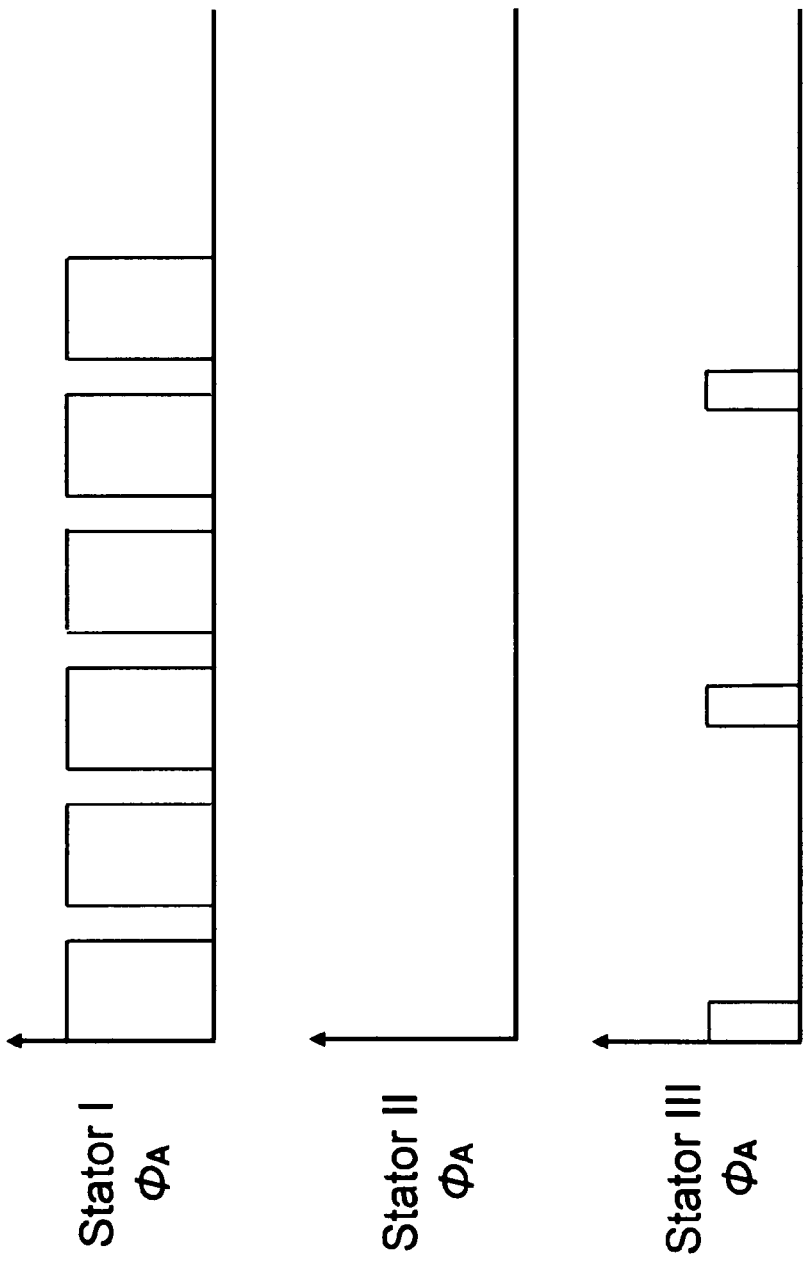

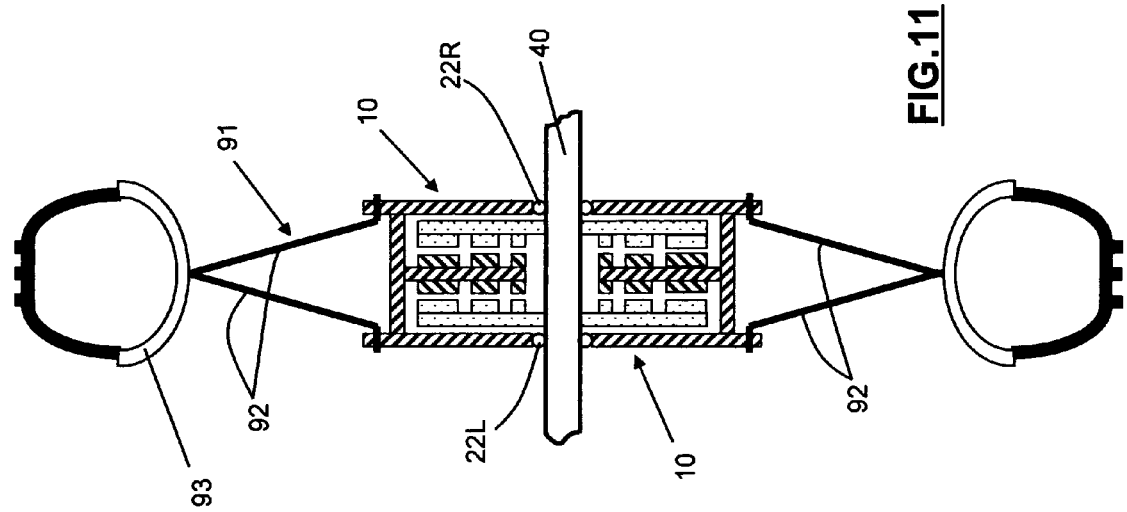

POWER CONTROL SYSTEM FOR VEHICLE DISK MOTOR

BACKGROUND OF THE INVENTION

This invention relates to brushless D.C.motors used for the propulsion of vehicles. More particularly, this invention relates to a power control system for a brushless D.C. vehicle propulsion motor with a more efficient design for optimizing power application to the motor.

Brushless D.C. vehicle propulsion motors are known and have been used for the propulsion of many different types of vehicles, such as bicycles, motorcycles, autos, and small trucks. A typical motor design has a rotor and a stator. The rotor is fixedly attached to the vehicle wheel for rotation therewith; the stator is attached to a vehicle stationary member, such as the fork of a bicycle or motorcycle frame. A specific type of brushless D.C. motor is a disk motor. In a disk motor, both the rotor and the stator typically comprise disks having circular geometry, with the rotor disk being rotationally arranged between two flanking stator disks. The rotor disk usually carries a plurality of permanent magnets mounted along a circular path centered on the rotational axis of the rotor disk. In some disk motors the permanent magnets are mounted along only one circular path; in others, the permanent magnets are mounted along two or more concentric circular paths. The stator disks are fixedly mounted to the vehicle and each stator disk carries a plurality of electromagnets distributed in one or more matching circular paths centered on the axis of the stator disk with essentially the same radii as the circular paths of the permanent magnets on the rotor disk. The coils of the electromagnets are typically coupled to a multi-phase driving circuit, usually in a three-phase arrangement. Electrical power for the driving circuit is supplied by a D.C. power source, such as a lead-acid battery, and a power conversion circuit is used to convert the D.C. electrical power from the battery to multi-phase pulse or A.C. power signals for synchronously driving the electromagnets mounted on the stator disks to provide rotating magnetic fields which interact with the rotor permanent magnets to provide the driving forces for the rotor. Typically, the electromagnets are grouped in phases, with all electromagnets in the same phase group being driven in unison and electromagnets in different phase groups being driven with differently phased power signals. A manually operable control circuit allows the frequency or the duty cycle of the power signals produced by the driving circuit to be varied, which causes the rotor to be driven at different rotational speeds by the rotating magnetic fields produced by the electromagnets. Rotor position signals generated by individual position sensors (such as Hall effect sensors) mounted adjacent the rotor at different angular positions, or by back EMF sensor circuits coupled to the coils, provide position information to govern the switching of the power signals to the next commutation state. A motor speed feedback signal is supplied to the control electronics. For a general discussion of brushless D.C. motor propulsion techniques, reference may be has to Application Note AVR:443 entitled "Sensor-based control of three phase Brushless DC motor" published by Atmel Corporation of San Jose, Calif. Examples of known multi-phase A.C. vehicle propulsion motors are shown in U.S. Pat. Nos. 6,100,615; 6,276,475 and 6,617,746, and U.S. Patent Application Publication Number U.S. 2002/0135220 A1, the disclosures of which are hereby incorporated by reference.

The basic disk motor configuration described thus far can be expanded to include several rotors and stators laterally spaced along the rotational axis of the disk motor. In such configurations, the driving circuit remains essentially the same, with multi-phase power signals being applied in parallel to the electromagnets mounted on the several stator plates.

In all known disk motor power control systems, the multi-phase pulse power signals are applied to all of the electromagnets in the stator disks, regardless of the actual vehicle speed or load demand on the disk motor. As a consequence, the energy demand on the battery power source is usually greater than that actually required by the disk motor in order to provide the propulsion force ideally required under a given set of vehicle speed or load conditions. This excessive use of battery power unduly limits the range of the associated vehicle and thus the performance of known brushless D.C. motor vehicle propulsion systems.

SUMMARY OF THE INVENTION

The invention comprises a power control technique for brushless D.C. vehicle disk motors which is devoid of the limitations noted above in known disk motor power control designs, and which is therefore capable of affording greater vehicle range on a given battery charge and providing greater vehicle range for a battery of given energy storage capacity.

In the broadest apparatus aspect, the invention comprises an electric vehicle propulsion system comprising:

a disk motor having at least one rotor disk having a peripheral edge and a plurality of permanent magnets distributed along a plurality of essentially circular substantially concentric paths, the paths being located inwardly of the peripheral edge; and a stator assembly positioned in facing relation to the rotor disk, the stator assembly having a mounting plate with a peripheral edge, a plurality of pole pieces distributed on the mounting plate along a plurality of essentially circular substantially concentric paths located inwardly of the peripheral edge of the mounting plate, and a plurality of coils each arranged about a corresponding one of the plurality of pole pieces, the plurality of coils being grouped into a plurality of phase groups, preferably three phase groups; and a power control circuit for supplying commutated power control signals to the coils in a manner determined by at least one current vehicle condition, the power control circuit including a source of electrical power; a vehicle condition parameter source for manifesting an electrical signal representative of a vehicle condition parameter; a controller having an input for receiving the electrical signal and a plurality of outputs for manifesting inverter control signals generated in response to the value of the electrical signal; and a plurality of inverters each having an input coupled to a different one of the controller outputs and a plurality of outputs for generating commutated power control signals for individual ones of the plurality of coils of the stator assemblies, each inverter having an associated set of stator coils and each one of the inverter outputs being coupled to a different one of the plurality of phase groups of the associated set of stator coils so that individual sets of stator coils can be selectively activated to optimize power drain from the source of electrical power in accordance with the value of the electrical signal. Preferably, when the coils are grouped into three phase groups the commutated power control signals applied to three phase groups of stator coils have a phase separation of substantially 120 degrees. Preferably, the vehicle condition parameter source can be a vehicle speed sensor for sensing current vehicle speed, or a vehicle load sensor for sensing the existing load on said disk motor.

The power control circuit may further include a vehicle operator controllable vehicle speed controller for generating an electrical signal representative of desired vehicle speed;

and the controller may include a second data input for receiving the electrical signals representative of desired vehicle speed so that the individual sets of stator coils can be selectively activated to optimize power drain from the source of electrical power in accordance with the value of the electrical signal representative of a vehicle condition parameter and the electrical signal representative of desired vehicle speed.

The controller preferably includes a collection of set point vehicle condition parameter values for specifying the individual sets of stator coils to be selectively activated. The set point vehicle condition parameter values can be vehicle speed set point values or disk motor load set point values.

The disk motor may include a pair of stator assemblies positioned in flanking relation to the rotor disk, with each of the stator assemblies having a mounting plate with a peripheral edge, a plurality of pole pieces distributed on the mounting plate along a plurality of essentially circular substantially concentric paths located inwardly of the peripheral edge of the mounting plate, and a plurality of coils each arranged about a corresponding one of the plurality of pole pieces, the plurality of coils being grouped into a plurality of phase groups. The disk motor may be further expanded into a plurality of axially spaced rotor assemblies and stator assembly pairs.

From a process standpoint, the invention comprises a method of controlling the application of electrical commutated power signals to a disk motor having at least one rotor disk with a peripheral edge and a plurality of permanent magnets distributed along a plurality of essentially circular substantially concentric paths, the paths being located inwardly of the peripheral edge; and a stator assembly positioned in flanking relation to the rotor disk, the stator assembly having a mounting plate with a peripheral edge, a plurality of pole pieces distributed on the mounting plate along a plurality of essentially circular substantially concentric paths located inwardly of the peripheral edge of the mounting plate, and a plurality of coils each arranged about a corresponding one of the plurality of pole pieces, the plurality of coils being grouped into a plurality of stator sets and phase groups, the method comprising the steps of:

(a) providing a source of electrical power;
 (b) generating a vehicle condition parameter signal representative of a vehicle condition parameter;
 (c) determining the value of the vehicle condition parameter signal;
 (d) generating a plurality of power control signals from the value of the vehicle condition parameter signal; and
 (e) applying the plurality of power control signals to phase groups of selective ones of the stator coil sets to optimize power drain from the source of electrical power in accordance with the value of the vehicle condition parameter signal.

The vehicle condition parameter signal may be representative of current vehicle speed or the existing load on the disk motor.

The method may further include the steps of:
 (f) generating an electrical signal representative of desired vehicle speed;
 (g) determining the value of the desired vehicle speed signal; and
 (h) using the value of the desired vehicle speed signal in steps (d) of generating and (e) of applying so that the individual sets of stator coils are selectively activated to optimize power drain from the source of electrical power in accordance with the value of the vehicle condition parameter signal and the electrical desired vehicle speed signal.

The disk motor may include a pair of stator assemblies positioned in flanking relation to the rotor disk, each of the stator assemblies having a mounting plate with a peripheral edge, a plurality of pole pieces distributed on the mounting plate along a plurality of essentially circular substantially concentric paths located inwardly of the peripheral edge of the mounting plate, and a plurality of coils each arranged about a corresponding one of the plurality of pole pieces, the plurality of coils being grouped into a plurality of stator sets and phase groups. When applied to this motor construction the step (e) of applying is performed on phase groups of selective ones of the stator coil sets of both stator assemblies.

The invention has wide application to a variety of vehicles, such as an automobile, a bicycle, a motorcycle, and the like. Electric vehicle propulsion systems fabricated according to the teachings of the invention are capable of being operated in a much more efficient manner than disk motors in which the stator coils are operated continuously in parallel. Specifically, only those stator set coils which are necessary to provide the optimum propulsion force to the vehicle are activated, which extends the useful life of the electrical energy stored in a battery power source. Consequently, a smaller battery can be used in an electrically powered vehicle propulsion system to obtain the same range of such a system using conventional stator coil activation techniques. In addition, given a battery of a specific energy capacity, a disk motor operated in accordance with the teachings of the invention can achieve a longer range than a disk motor operated according to conventional techniques.

For a fuller understanding of the nature and advantages of the invention, reference should be made to the ensuing detailed description taken in conjunction with the accompanying drawings.

BRIEF DESCRIPTION OF THE DRAWINGS

FIGS. 8A-8C are power control signal waveform diagrams illustrating the power control signals applied to the same phase group coils of three stator sets of coils;

FIG. 11 is a schematic sectional view of the disk motor of FIG. 1 adapted for use with a spoked wheel.

DETAILED DESCRIPTION OF THE PREFERRED EMBODIMENTS

Figure 1:
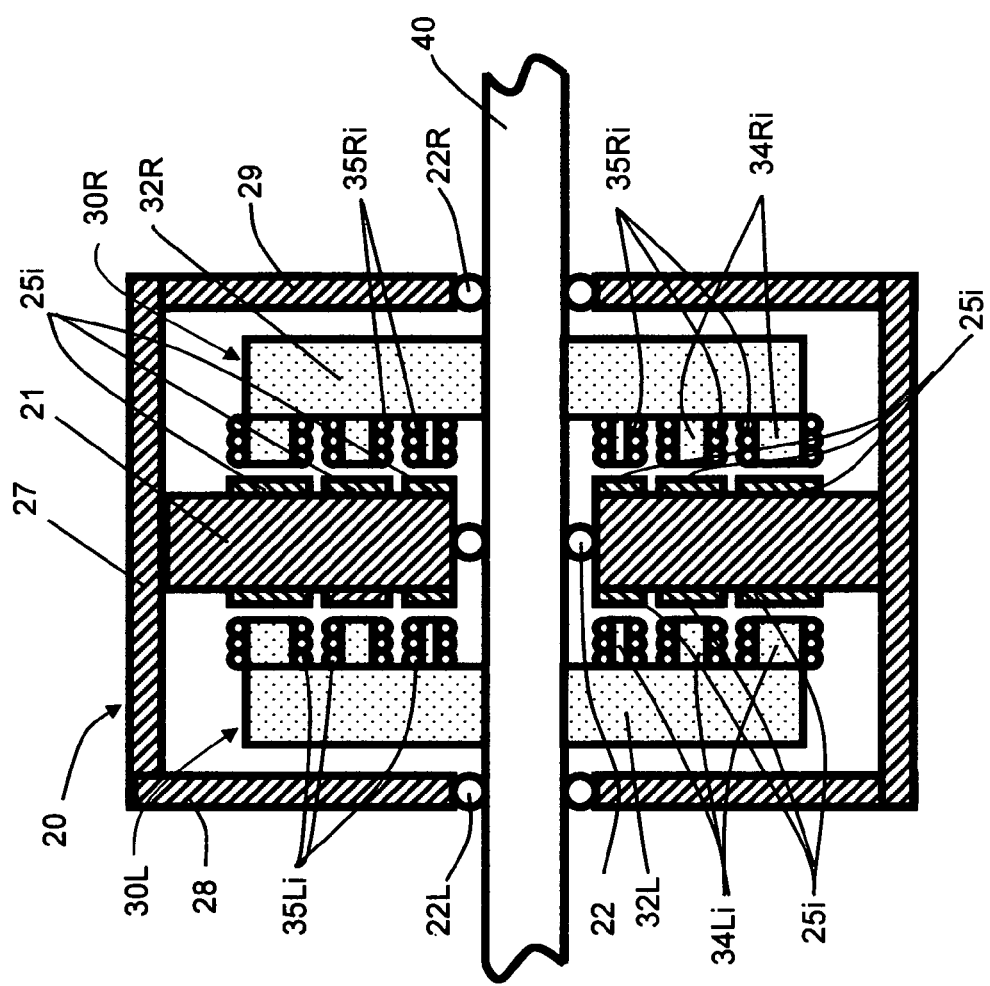
FIG. 1 is a sectional view taken along the longitudinal axis of a disk motor having a single rotor and a pair of flanking stators.

Turning now to the drawings, FIG. 1 is a sectional view taken along the longitudinal axis of a disk motor having a single rotor and a pair of flanking stators. As seen in this FIG., the disk motor includes a disk rotor assembly 20 and a pair of stator assemblies 30L, 30R. Disk rotor assembly 20 comprises a central disk member 21 rotatably mounted by means of a standard low friction bearing 22 to a mounting shaft 40. Shaft 40 is secured to the frame of a vehicle (not shown) and serves as the mounting support for the disk motor. Shaft 40 may comprise an axle stub of an automobile, for example. Secured to opposing faces of disk member 21 are a plurality of permanent magnets 25$i$. Disk member 21 is fabricated from a non-magnetic material, such as Delrin, Nylon, aluminum, or any other relatively stiff non-magnetic material. Permanent magnets 25$i$ are secured to disk member 21 using any one of a number of known techniques, such as adhesive bonding with a secure bonding adhesive (e.g. an epoxy resin adhesive); thermal bonding; welding; or the equivalent. Disk member 21 is secured to an axially extending cylindrical wall member 27, which is secured at each end to a pair of end plates 28, 29 in contact with the outer race of bearings 22L, 22R, respectively.

Each stator assembly 30L, 30R comprises a mounting plate 32L, 32R, a plurality of pole pieces 34L$i$, 34R$i$, and a plurality of coils 35L$i$, 35R$i$ each arranged about the outer circumference of an associated pole piece 34L$i$, 34R$i$. Pole pieces 34L$i$, 34R$i$ are fabricated from a suitable magnetically susceptible material, preferably silicon steel, and are secured to their respective mounting plates 32L, 32R using any suitable bonding technique such as a strong adhesive, welding, or the like. Mounting plates 32L, 32R are fixedly secured to shaft 40 so that the stator assembly 30 does not move on shaft 40.

Figure 2:
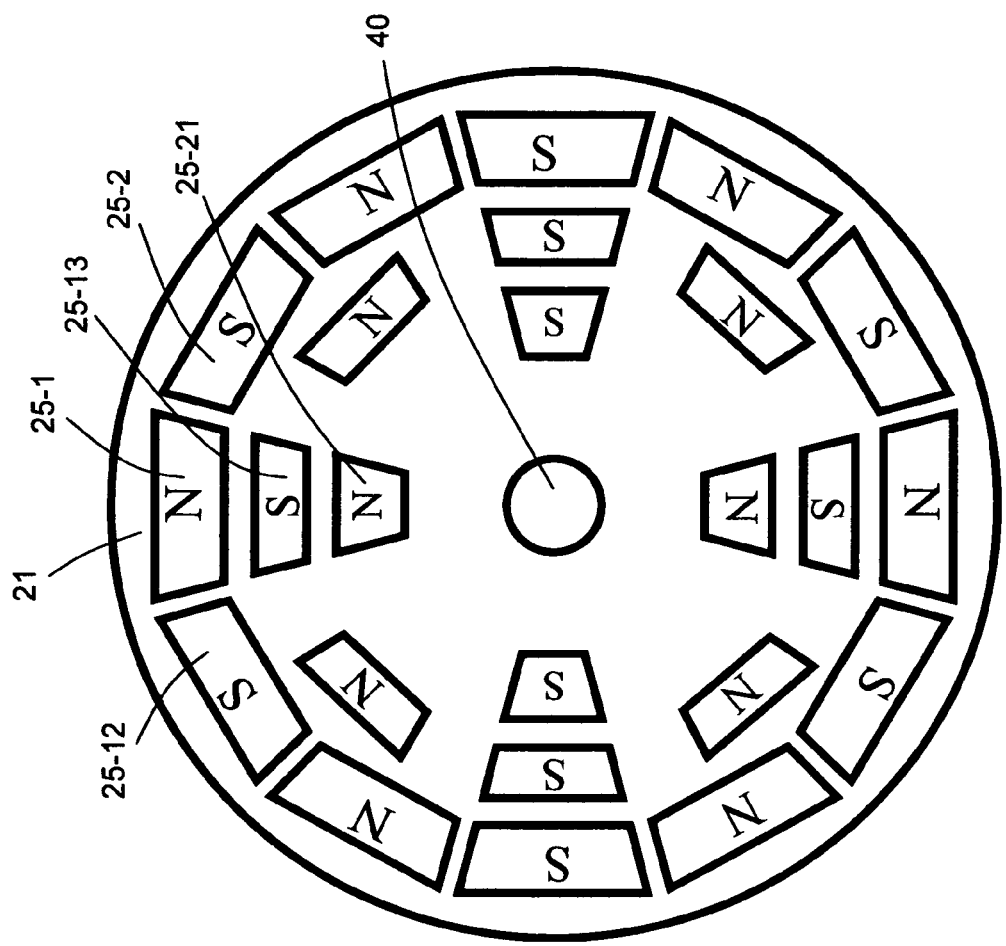
FIG. 2 is a front plan view of the rotor disk of the disk motor of FIG. 1.

As best seen in FIG. 2, permanent magnets 25$i$ are arranged about the two major opposing surfaces of disk member 21 in circular paths. In the embodiment of FIGS. 1 and 2 three concentric circular paths of permanent magnets 25$i$ are disposed on each major surface of disk member 21. The permanent magnets 25$i$ in each circular path on one surface of disk member 21 are physically arranged so that adjacent magnets in each circular path have magnetic orientation of opposite polarity. In addition, magnets 25$i$ mounted on opposite sides of disk member 21 in mutual registration have magnetic orientations of additive polarity. Still further, adjacent magnets 25$i$ in the different circular paths on the same surface of disk member 21 are also arranged to have magnetic orientations of opposite polarity. For example, adjacent magnets 25-12, 25-1, and 25-2 in the outer circular path on disk member 21 have South (S)-North (N)-South (S) magnetic orientations (see FIG. 2). Magnet 25-1 and its counterpart in the outer circular path on the opposite side of disk member 21 have additive N-S magnetic orientations. Magnet 25-1 in the outer circular path of disk member 21 and magnet 25-13 in the middle circular path on the same side of disk member 21 have N-S magnetic orientations. Similarly, Magnet 25-13 in the middle circular path of disk member 21 and magnet 25-21 in the inner circular path of disk member 21 have S-N magnetic orientations.

The magnetic orientations shown in FIG. 2 for magnets 25$i$ and labeled either N or S denote the polarity of the magnetic field at the outer surface of each magnet 25$i$. To illustrate, FIG. 2 shows magnet 25-1 with an N orientation; and magnet 25-13 with an S orientation. For magnet 25-1, the N signifies that the outer surface of magnet 25-1 is the North pole of the magnet, while the South pole of magnet 25-1 is at the inner surface which confronts the outer surface of disk member 21. Similarly, for magnet 25-13, the S signifies that the outer surface of magnet 25-13 is the South pole of the magnet, while the North pole of magnet 25-13 is at the inner surface which confronts the outer surface of disk member 21. Thus, these two magnets are arranged in a magnetically additive manner.

Figure 3:
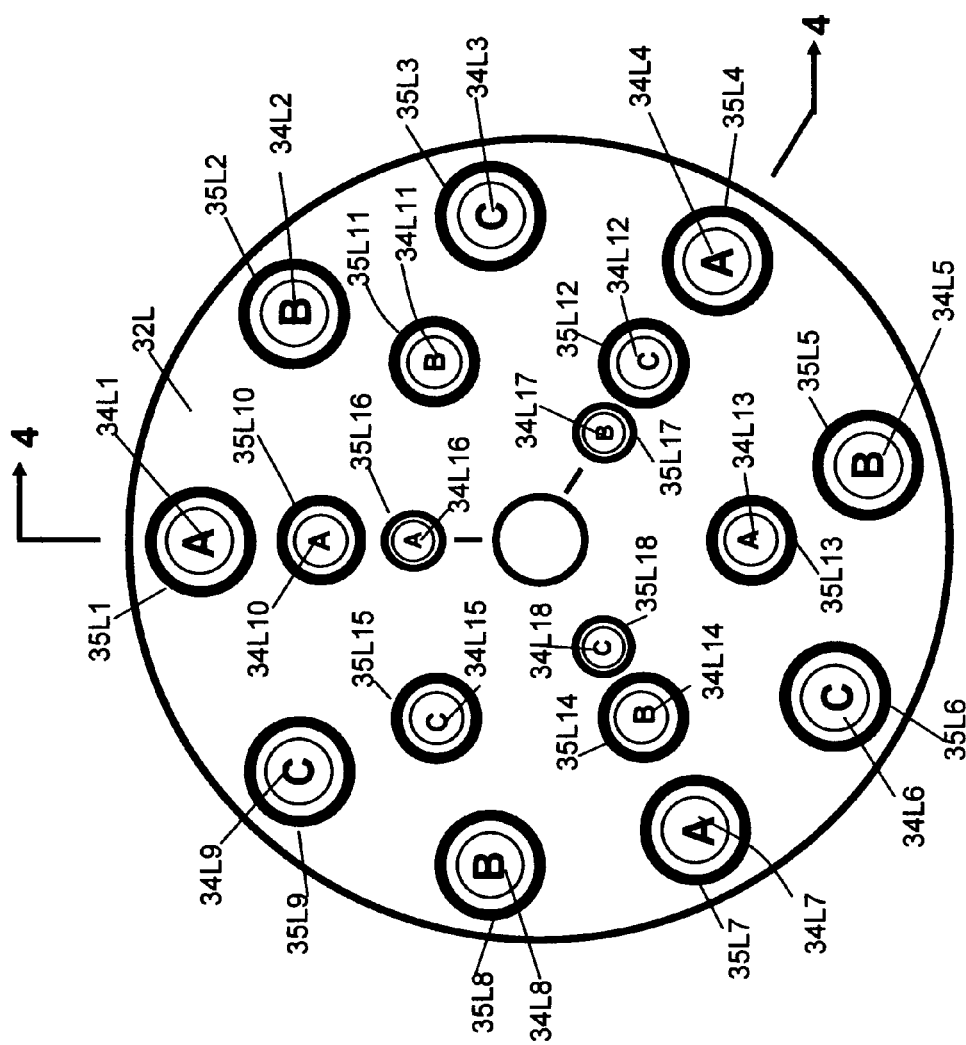
FIG. 3 is a front plan view of one of the two stators of the disk motor of FIG. 1.
Figure 4:
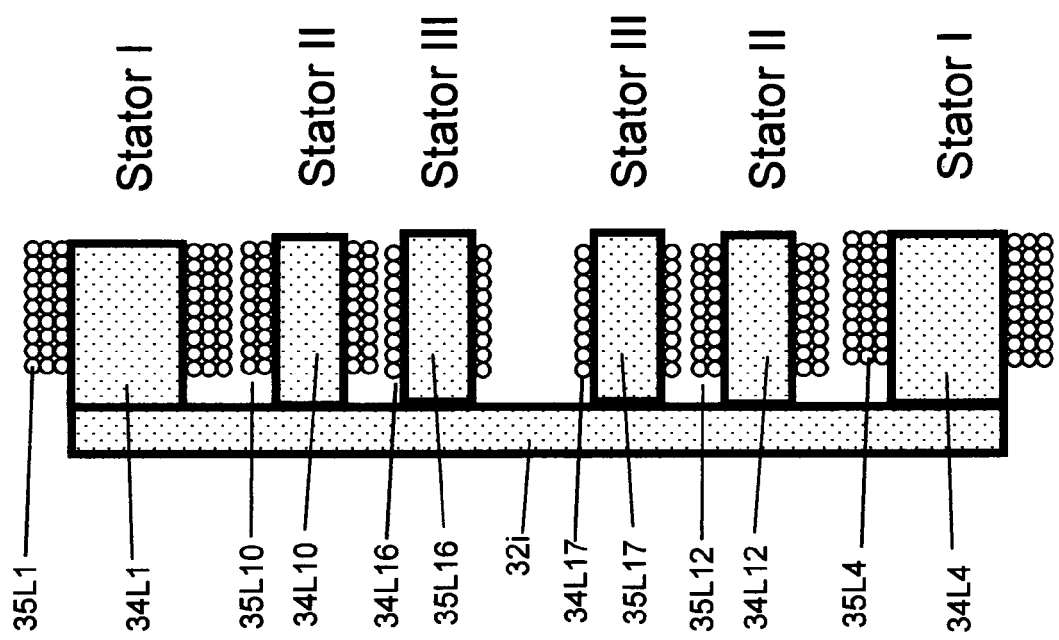
FIG. 4 is a sectional view taken along lines 4-4 of the stator of FIG. 3.

FIGS. 3 and 4 illustrate the physical arrangement of the pole pieces 34L$i$ and coils 35L$i$ for the left stator assembly 30L. The right stator assembly has an identical physical layout. As seen in FIG. 3, pole pieces 34L$i$ are distributed on the surface of mounting plate 32L in three concentric circular paths which match the circular paths described by magnets 25$i$ on the rotor disk member 21. As seen in FIG. 4, each coil 35L$i$ is arranged about a corresponding pole piece 34L$i$ and secured thereto in any suitable fashion. The number of pole pieces 34L$i$ and the number of coils 35L$i$ is different from the number of magnets 25$i$ on the facing side of rotor disk 21. The same is true for the number of pole pieces 34R$i$ and the number of coils 35R$i$ of the right stator assembly 30R.

Also with reference to FIGS. 3 and 4, for purposes of electrical connection the coils 35L$i$ are grouped into three sets: Stator set I, Stator set II, and Stator set III; and three phase groups: group A, group B, and group C. For the set grouping, in the outer circular path coils 35L1-35L9 constitute Stator set I; in the middle circular path coils 35L10-35L15 constitute Stator set II; and in the inner circular path coils 35L16-18 constitute Stator set III. For the phase grouping, in the outer circular path coils 35L1, 35L4, and 35L7 are group A coils; coils 35L2, 35L5, and 35L8 are group B coils; and coils 35L3, 35L6, and 35L9 are group C coils. In the middle circular path, coils 35L10, and 35L13 are group A coils; coils 35L11 and 35L14 are group B coils; and coils 35L12 and 35L15 are group C coils. In the inner circular path there is only one coil per group-viz, coil 35L16 (group A); coil 35L17 (group B); and coil 35L18 (group C). The coils 35R$i$ of the right stator sub-assembly 30R are similarly grouped.

Figure 5:
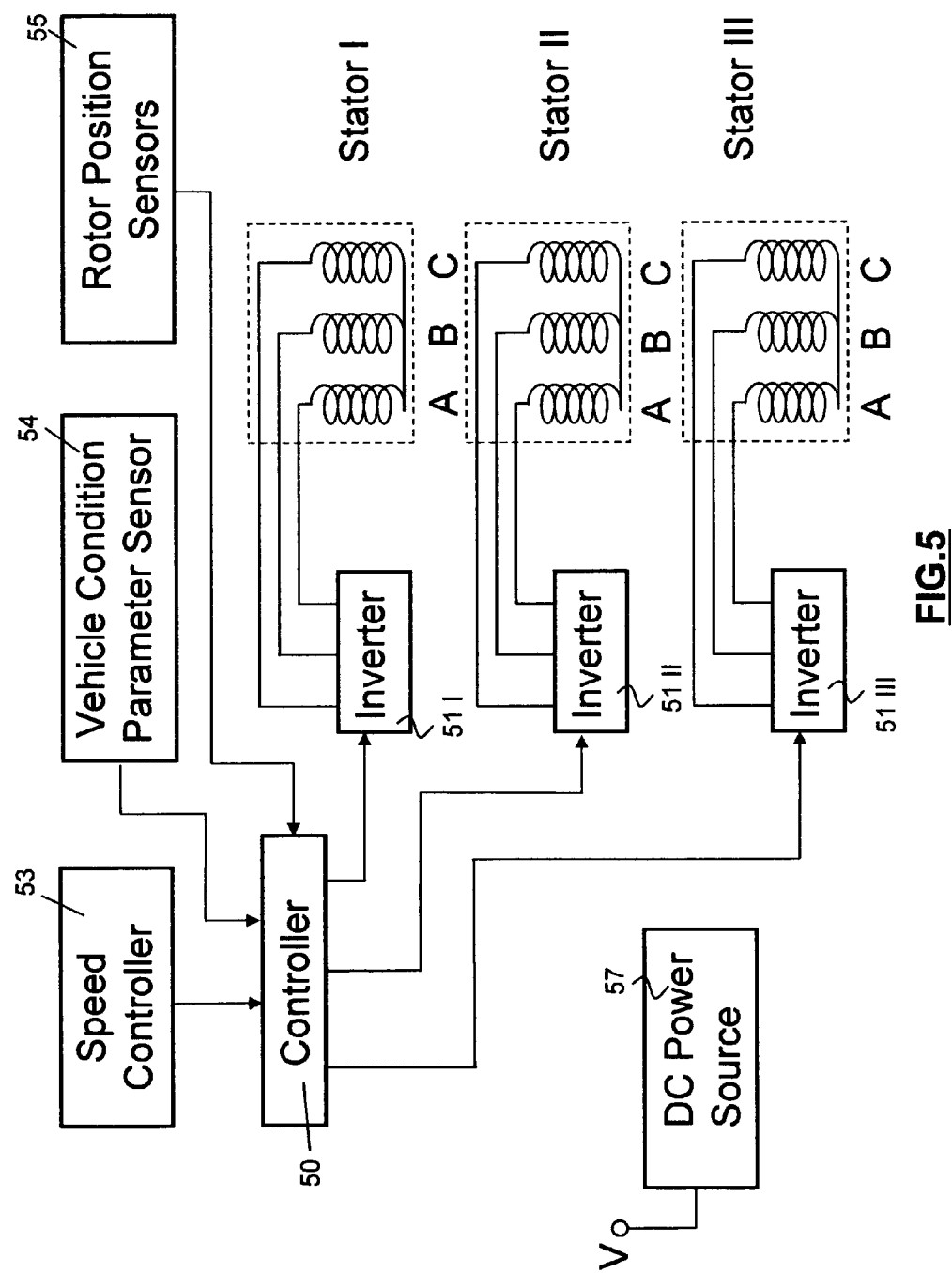
FIG. 5 is a schematic diagram of the disk motor power control system.

FIG. 5 is a schematic diagram of the disk motor power control system. As seen in this FIG., a controller 50 supervises the operation of a plurality of power inverters 51I, 51II, and 51III. The three phase outputs from each of the inverters 51I, 51II, and 51III are coupled respectively to the three phase groups A-C of coils 35$i$ in the associated stator sets I-III to provide commutated power signals thereto. Controller 50 preferably comprises a microcontroller, such as a type AVR microcontroller available from Atmel Corporation of San Jose, Calif. Controller 50 receives real time data from three data sources: a vehicle speed controller 53, a vehicle condition parameter sensor 54, and the rotor position sensors 55 in the disk motor. Vehicle speed controller 53 may comprise the accelerator pedal position sensor in an automotive vehicle, the manually operable speed control of a motorcycle or a bicycle, or any other known operator controllable device for enabling the vehicle operator to alter the vehicle speed. Vehicle parameter condition sensor 54 may comprise a vehicle speed indicator, a vehicle load sensor for sensing the existing load on the disk motor, or any other known device for supplying an electrical signal representative of a vehicle parameter which affects the mode of operation of the disk motor. Rotor position sensors 55 may comprise Hall effect sensors mounted in preselected angular positions adjacent the disk rotor 20, back EMF sensor circuits, or any other known device for generating rotor angular position signals representative of rotor position referenced to a preselected angular reference point. Electrical power is supplied to elements 50, 51, 53, 54, and 55 by a suitable D.C. power source 57, such as a battery or a combination of a battery and a regulator circuit.

Figure 6:
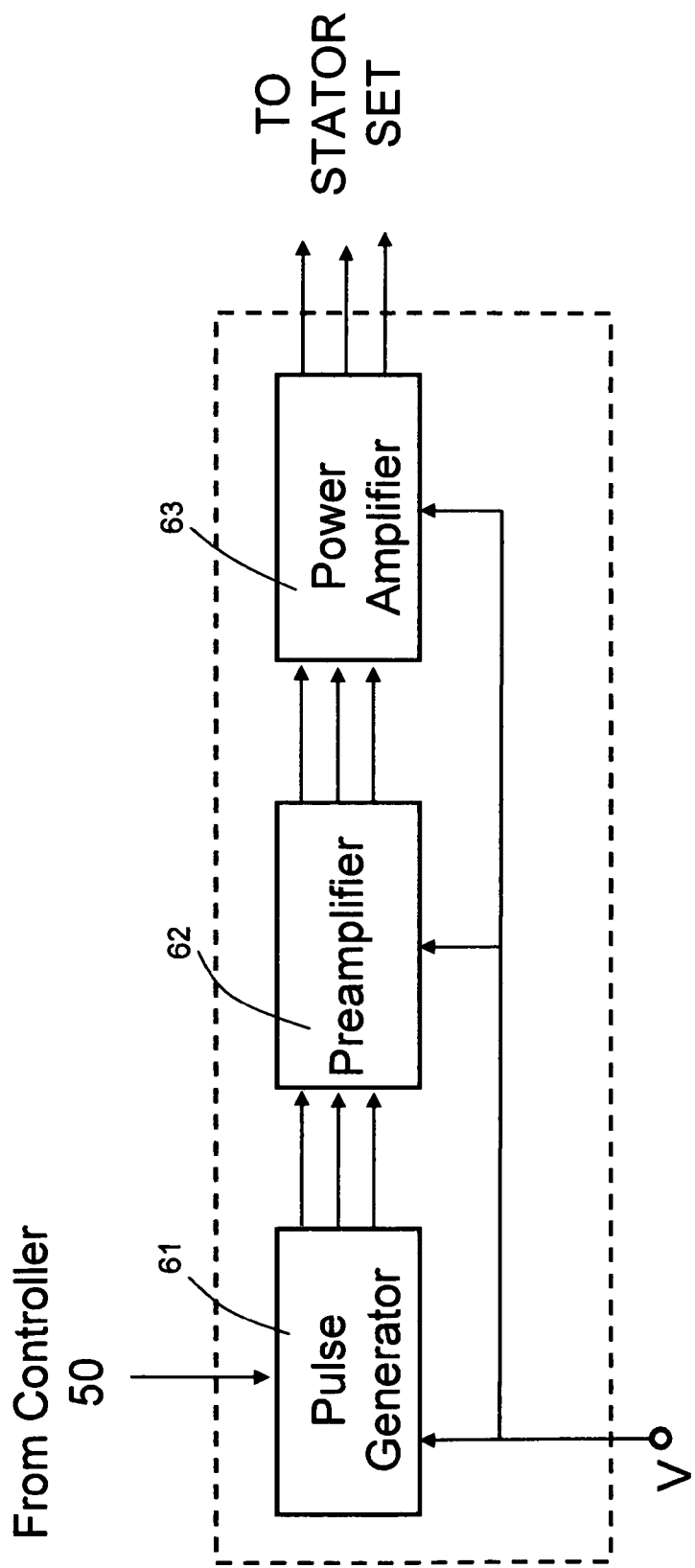
FIG. 6 is a block diagram of an inverter used in the power control system of FIG. 5.

FIG. 6 is a block diagram illustrating the major components of each of the inverters 51I, 51II, and 51III. As seen in this FIG., each inverter includes a pulse generator 61 for generating commutated pulse signals in accordance with synchronous control signals from controller 50. Pulse generator 61 emits three separate pulse trains with a phase separation of 120 degrees. The three pulse train output signals from pulse generator 61 are coupled to a preamplifier 62, and the three pulse train outputs of preamplifier 62 are coupled to a power amplifier in which the pulse signals are amplified prior to being coupled to the coils 35*i* of the associated Stator set.

Figure 7:
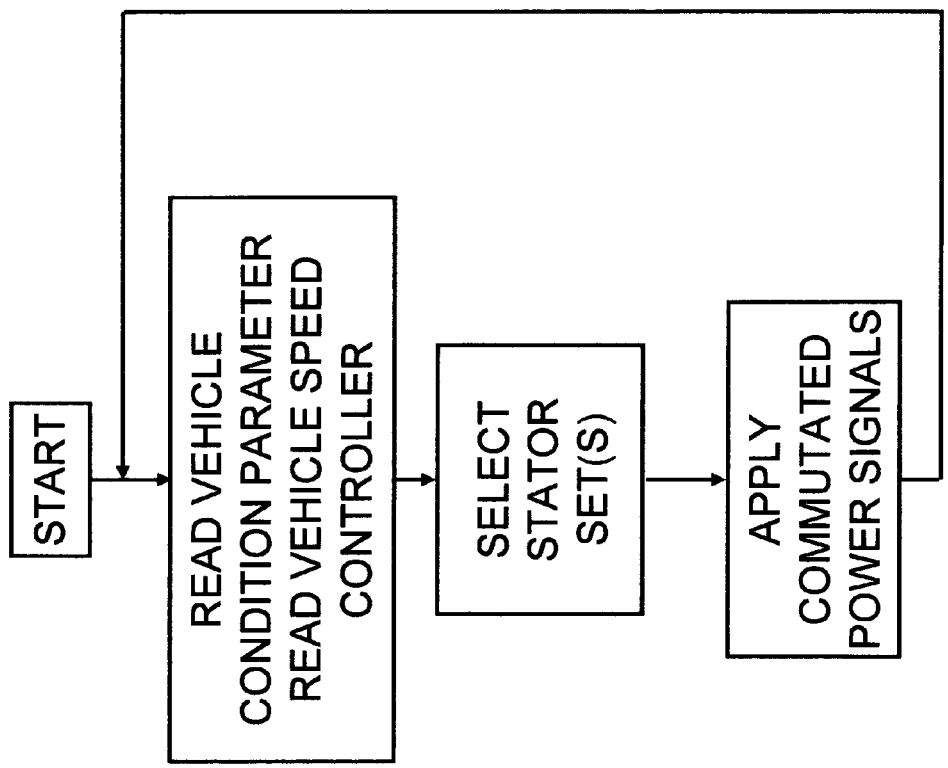
FIG. 7 is a flow chart illustrating operation of the disk motor power control circuit.

FIG. 7 is a flow chart illustrating operation of the power control circuit. Upon startup, controller 50 samples the data inputs from speed controller 53 and vehicle condition parameter sensor 54. Next, controller 50 selects the stator sets to be activated. This may be done using a table look-up routine which consults a stored table of vehicle condition parameter values, speed controller values and stator set actuation rules. Next, controller 50 generates control signals to the inverters 51*i*, which produce the power control signals for the appropriate stator sets. The process is repeated, changing the stator set actuation conditions in response to changes in the data inputs from speed controller 53 and vehicle condition parameter sensor 54.

The manner in which the various stator sets is controlled can be determined empirically or theoretically. The main criterion is to provide the optimum set of power control signals to the stator sets while minimizing power drain from the battery in the D.C. power source 57. As an example, for an automotive application the following table of vehicle speed versus activated stator sets is theoretically optimal for prolonging battery life:

| Measured Vehicle Speed | Activated Stator Sets |
|---|---|
| 0.0 to 5.0 mph. | I, II, and III |
| 5.1 to 15.0 mph. | I and II |
| 15.1 to 30.0 mph. | I and III |
| 30.1 to 45.0 mph. | II and III |
| 45.1 to 60.0 mph. | II only |
| 60.1 and above mph. | III only |

Note that this table only includes the actual measured vehicle speed as the vehicle condition parameter signal. If the demanded vehicle speed signals from speed controller 53 are also included, the relation between measured vehicle speed and activated stator sets can be altered to take into consideration the operator's desire to accelerate the vehicle at a faster rate (although at the expense of greater energy drain from the battery) or permit the vehicle to decelerate with none of the stator coil sets activated (minimum power consumption).

In operation in the acceleration mode, with the vehicle at rest commutated power signals are initially applied to all three of the stator sets of coils until the vehicle attains a speed of 5.1 mph. At this set point, the application of commutated power signals is switched so that power is applied to the coils in only stator sets I and II. When the vehicle attains a speed of 15.1 mph, the application of commutated power signals is switched so that power is applied to the coils in only stator sets I and III. When the vehicle attains a speed of 30.1 mph, the application of commutated power signals is switched so that power is applied to the coils in only stator sets II and III. When the vehicle attains a speed of 45.1 mph, the application of commutated power signals is switched so that power is applied to the coils in stator set II only. When the vehicle attains a speed of 60.1 mph, the application of commutated power signals is switched so that power is applied to the coils in stator set III only.

In the deceleration mode, if the vehicle speed drops below 60.1 mph and the operator wishes to maintain a speed of 60.1 mph or above, the application of commutated power signals is switched so that power is applied to the coils in stator set II only. If the vehicle speed drops below 45.1 mph and the operator wishes to maintain a speed between 45.1 and 60.0 mph, the application of commutated power signals is switched so that power is applied to the coils in stator sets II and III only. If the vehicle speed drops below 30.1 mph and the operator wishes to maintain a speed between 30.1 and 45.0 mph, the application of commutated power signals is switched so that power is applied to the coils in stator sets I and III only. If the vehicle speed drops below 15.1 mph and the operator wishes to maintain a speed between 15.1 and 30.0 mph, the application of commutated power signals is switched so that power is applied to the coils in stator sets I and II only. If the vehicle speed drops below 15.1 mph and the operator wishes to maintain a speed between 0.0 and 15.0 mph, the application of commutated power signals is switched so that power is applied to the coils in stator sets I, II and III.

In the deceleration mode the demanded vehicle speed signals may be used to override the above table so that all stator coil sets are deactivated when the vehicle operator wants the vehicle to coast to a lower speed. Similarly, when the vehicle is cruising at a given speed and the vehicle operator wishes to accelerate at a great rate (e.g., when passing another vehicle), the demanded vehicle speed signals may be used to override the above table and activate all stator sets to supply maximum power to the disk motor.

As noted above, the vehicle condition parameter sensor may comprise a vehicle load sensor for sensing the existing load on the disk motor. For such an implementation, the switching set points for the stator coil sets will be based on disk motor load values instead of mph measurements. Thus, the application of commutated power signals to the stator coil sets will be switched in accordance with the measured load values attaining certain threshold values. The actual set point values for a given vehicle can best be determined on an empirical basis.

Figure 8A:
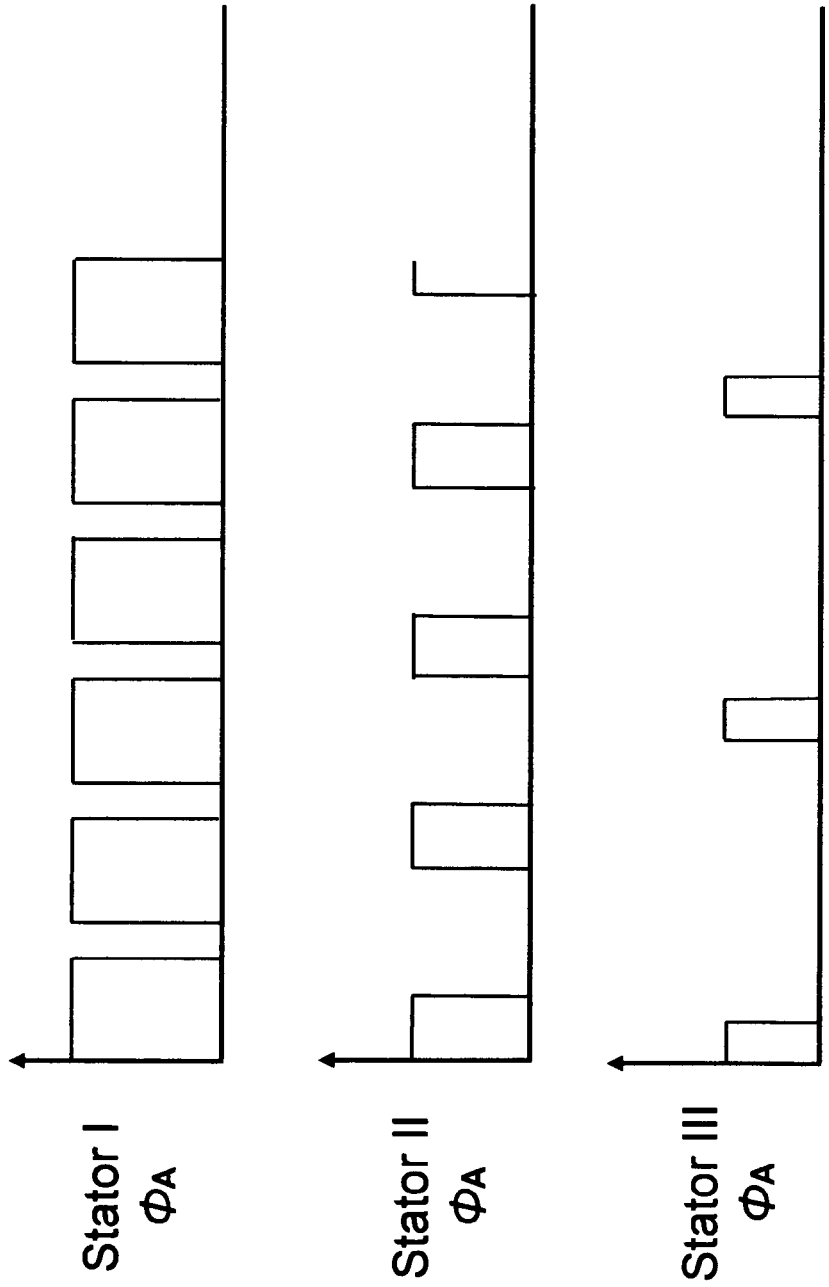
Figure 8B:
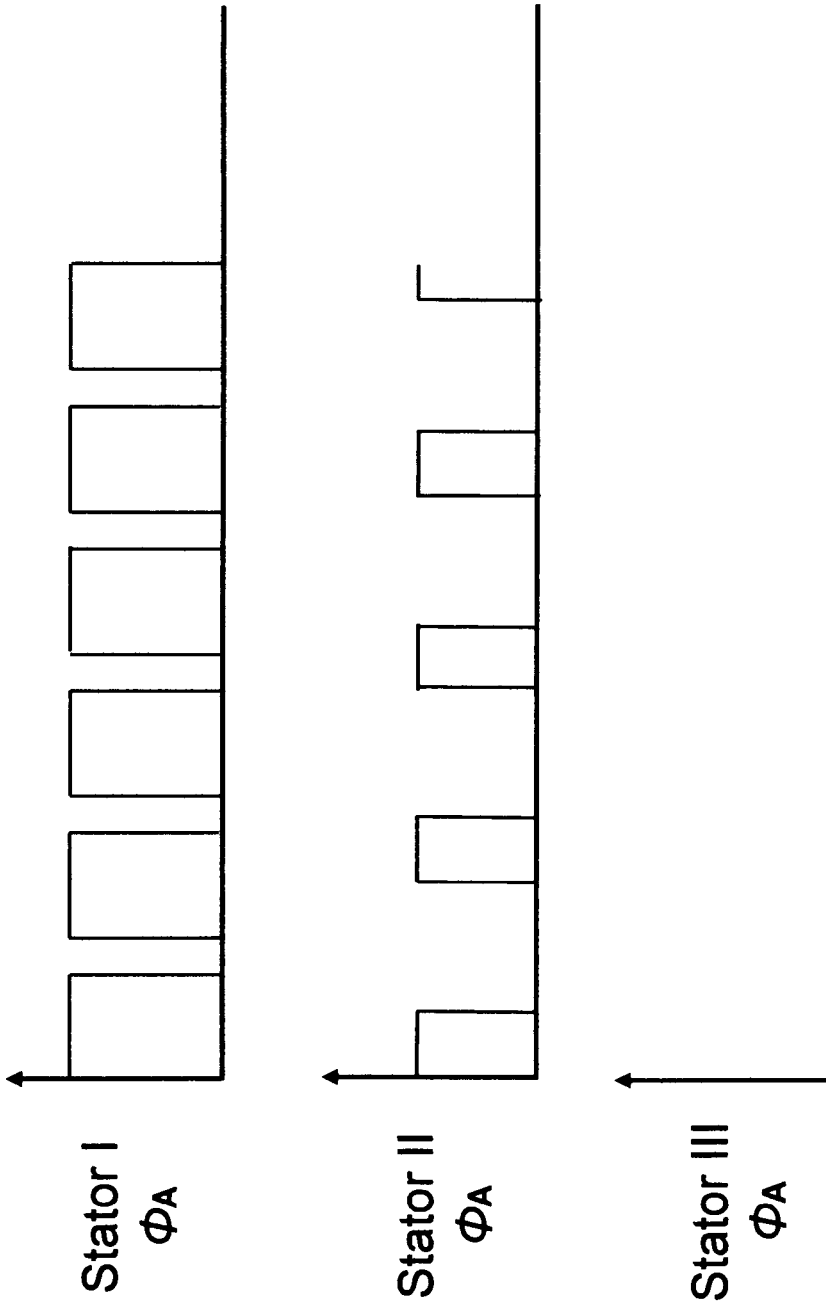

FIGS. 8A-8C illustrate the power signals applied to the stator sets for the first three sets of power conditions set forth in the above table. In each of these Figs., the power signals are illustrated for only one phase of the three possible phases for each stator set. In FIG. 8A power signals are applied to the phase A coils of all three of the stator sets. In FIG. 8B power signals are applied to the phase A coils of stator sets I and II-no power signals are applied to the phase A coils of stator set III. In FIG. 8C power signals are applied to the phase A coils of stator sets I and III-no power signals are applied to the phase A coils of stator set II. The power signals applied to the phase B and phase C coils of the three stator sets are controlled in a similar manner but are phase displaced by 120 degrees from those illustrated in FIGS. 8A-8C.

Figure 9:
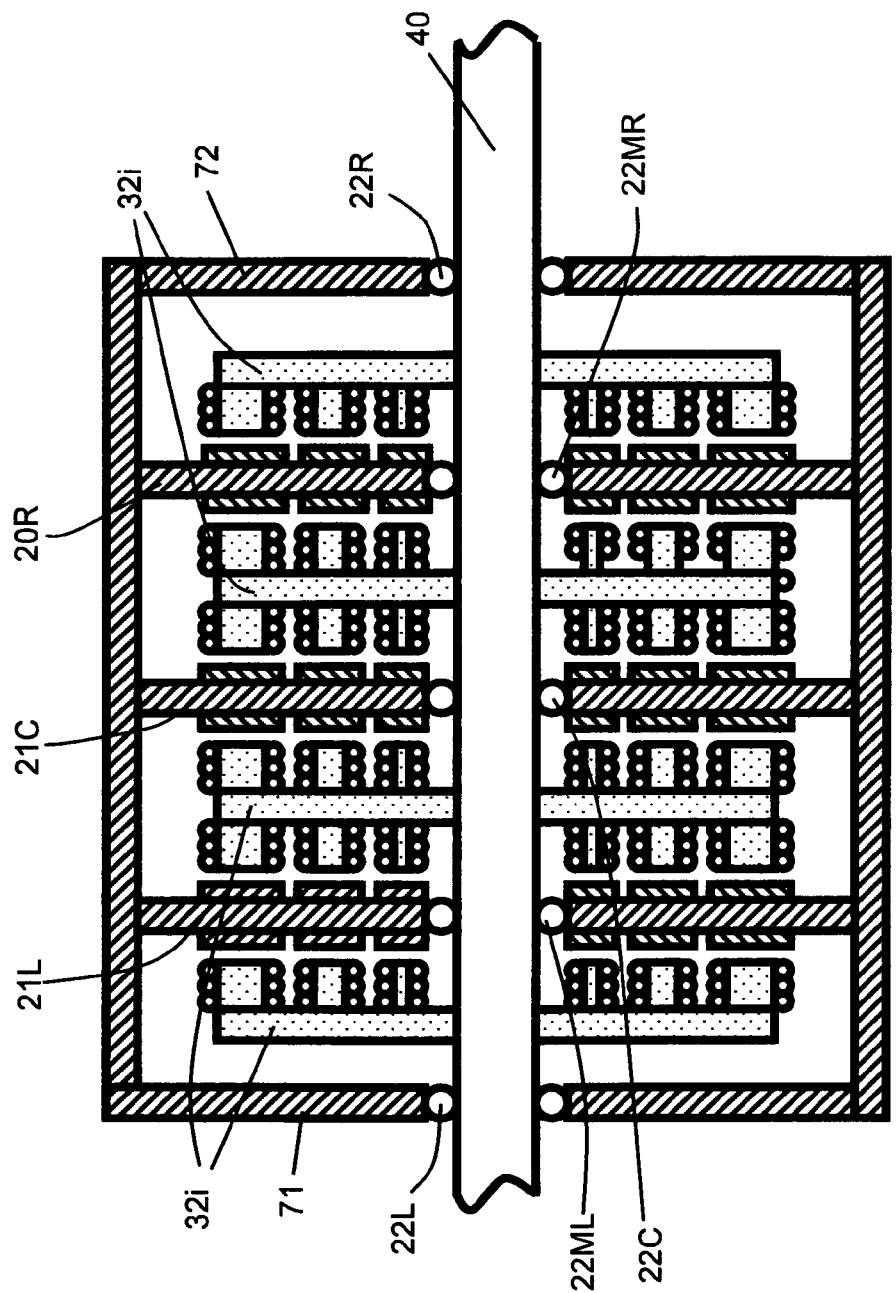
FIG. 9 is a sectional view of a disk motor having three rotors and six stators.

While the invention has been thus far described with reference to a disk motor having a single rotor assembly 20 and two flanking stator assemblies 30L, 30R, the invention is equally applicable to disk motors having different configurations. FIG. 9 illustrates one such alternate configuration. As seen in this FIG., a disk motor has three disk rotor assemblies; and three corresponding stator assemblies. Each of the disk rotor and stator assemblies is identical to that described above with reference to FIGS. 1-4. In this embodiment, end plates 71, 72 are rotatably mounted on support shaft 40 using low friction bearings 22L, 22R; rotor disks 21L, 21C, and 21R are rotatably mounted on shaft 40 using low friction bearings 22ML, 22C, and 22MR; and all of the stator mounting plates 32*i* are firmly secured to shaft 40 to prevent rotation of the stator assemblies 30*i*.

Figure 10:
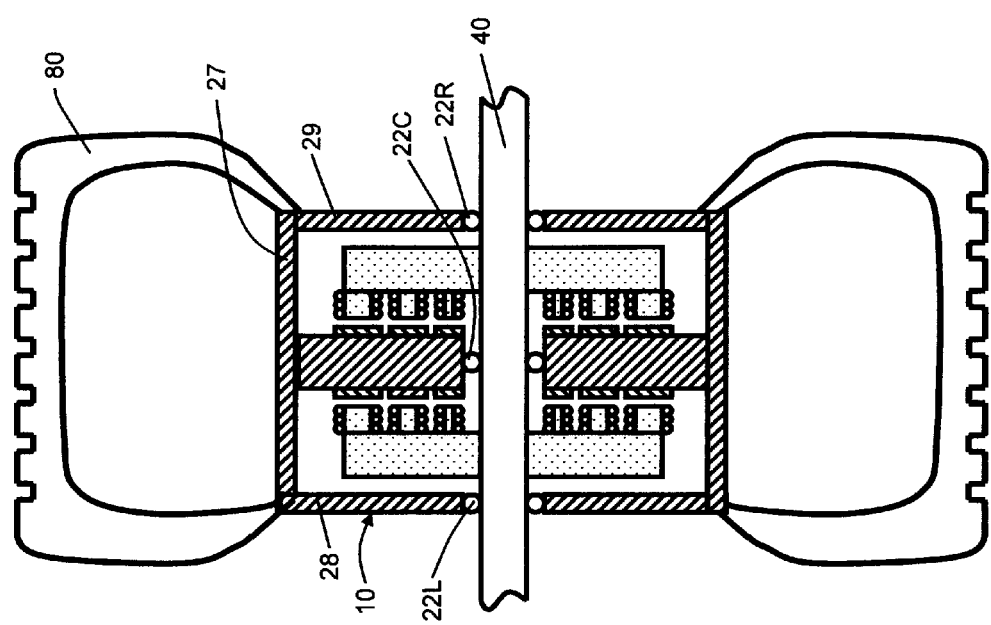
FIG. 10 is a schematic sectional view of the disk motor of FIG. 1 adapted for use with an automobile wheel.

FIG. 10 is a sectional view of the FIG. 1 disk motor adapted for use as a driving motor for the wheel of an automobile having a pneumatic tire 80. As seen in this FIG., disk motor 10 is positioned concentrically of tire 80 and provides the propulsion force for the wheel. Wall enclosure 27 can form an integral part of the rim of a wheel. Alternatively, wall enclosure 27 may be attached to the wheel in concentric fashion.

FIG. 11 is a sectional view similar to FIG. 10, but illustrating the application of the invention to a spoked wheel 91, such as one used on bicycles and motorcycles. As seen in this FIG., wheel 91 has a plurality of individual spokes 92 connected between a rim 93 and the disk motor housing. Disk motor assembly 10 is concentrically mounted with respect to the wheel 91, and may form the wheel hub. Shaft 40 can be connected to the fork of the cycle.

Instead of providing separate permanent magnets positioned on opposite surfaces of the rotor disk, the rotor disk may be provided with magnet apertures and a single magnet having a thickness greater than the thickness of the rotor disk may be installed in a given aperture with each pole surface of the magnet extending out of the plane of the facing surface of the rotor disk. This arrangement substantially reduces the total number of individual magnets needed and simplifies the magnet alignment procedure.

As will now be apparent, disk motors driven by the power control signals according to the invention are operated in a much more efficient manner than disk motors in which the stator coils are operated continuously in parallel. Specifically, only those stator set coils which are necessary to provide the optimum propulsion force to the vehicle are activated, which extends the useful life of the electrical energy stored in the battery power source. Consequently, a smaller battery can be used in an electrically powered vehicle propulsion system to obtain the same range of such a system using conventional stator coil activation techniques. In addition, given a battery of a specific energy capacity, a disk motor operated in accordance with the teachings of the invention can achieve a longer range than a disk motor operated according to conventional techniques.

While the invention has been described with reference to particular embodiments, various modifications, alternate constructions and equivalents may be employed without departing from the spirit of the invention. For example, while the embodiments illustrated and described use three concentric circular magnetic element paths, other configurations may be employed using different numbers of circular paths. In addition, the number of disk rotor assemblies and paired stator assemblies incorporated into the motor housing may be expanded beyond one, as desired. Also, although pulse control signals have been disclosed as the form of commutated power signals applied to the stator coils, A.C. signals can be employed, as desired. Therefore, the above should not be construed as limiting the invention, which is defined by the appended claims.

What is claimed is:

1. An electric vehicle propulsion system comprising:
a disk motor having at least one rotor disk having a peripheral edge and a plurality of permanent magnets distributed along a plurality of essentially circular substantially concentric paths, said paths being located inwardly of said peripheral edge; and a stator assembly positioned in facing relation to said rotor disk, said stator assembly having a mounting plate with a peripheral edge, a plurality of pole pieces distributed on said mounting plate along a plurality of essentially circular substantially concentric paths located inwardly of said peripheral edge of said mounting plate, and a plurality of coils each arranged about a corresponding one of said plurality of pole pieces, said plurality of coils being grouped into a plurality of phase groups; and
a power control circuit for supplying commutated power control signals to said coils in a manner determined by at least one current vehicle condition, said power control circuit including a source of electrical power; a vehicle condition parameter source for manifesting an electrical signal representative of a vehicle condition parameter; a controller having an input for receiving said electrical signal and a plurality of outputs for manifesting inverter control signals generated in response to the value of said electrical signal; and a plurality of inverters each having an input coupled to a different one of said controller outputs and a plurality of outputs for generating commutated power control signals for individual ones of said plurality of coils of said stator assemblies, each said inverter having an associated set of stator coils and each one of said inverter outputs being coupled to a different one of said plurality of phase groups of said associated set of stator coils so that individual sets of stator coils can be selectively activated to optimize power drain from said source of electrical power in accordance with the value of said electrical signal.

2. The invention of claim 1 wherein said vehicle condition parameter source comprises a vehicle speed sensor for sensing current vehicle speed.

3. The invention of claim 1 wherein said vehicle condition parameter source comprises a vehicle load sensor for sensing the existing load on said disk motor.

4. The invention of claim 1 wherein said power control circuit further includes a vehicle operator controllable vehicle speed controller for generating an electrical signal representative of desired vehicle speed; and wherein said controller includes a second data input for receiving said electrical signals representative of desired vehicle speed so that said individual sets of stator coils can be selectively activated to optimize power drain from said source of electrical power in accordance with the value of said electrical signal representative of a vehicle condition parameter and said electrical signal representative of desired vehicle speed.

5. The invention of claim 1 wherein said controller includes a collection of set point vehicle condition parameter values for specifying the individual sets of stator coils to be selectively activated.

6. The invention of claim 5 wherein said set point vehicle condition parameter values are vehicle speed set point values.

7. The invention of claim 5 wherein said set point vehicle condition parameter values are disk motor load set point values.

8. The invention of claim 1 wherein said plurality of coils are grouped into three phase groups.

9. The invention of claim 8 wherein said commutated power control signals applied to said three phase groups of stator coils have a phase separation of substantially 120 degrees.

10. The invention of claim 1 wherein said disk motor includes a pair of stator assemblies positioned in flanking relation to said rotor disk, each of said stator assemblies having a mounting plate with a peripheral edge, a plurality of pole pieces distributed on said mounting plate along a plurality of essentially circular substantially concentric paths located inwardly of said peripheral edge of said mounting plate, and a plurality of coils each arranged about a corresponding one of said plurality of pole pieces, said plurality of coils being grouped into a plurality of phase groups.

11. A method of controlling the application of electrical commutated power signals to a disk motor having at least one rotor disk with a peripheral edge and a plurality of permanent magnets distributed along a plurality of essentially circular substantially concentric paths, the paths being located inwardly of the peripheral edge; and a stator assembly positioned in flanking relation to the rotor disk, the stator assembly having a mounting plate with a peripheral edge, a plurality of pole pieces distributed on the mounting plate along a plurality of essentially circular substantially concentric paths located inwardly of the peripheral edge of the mounting plate, and a plurality of coils each arranged about a corresponding one of the plurality of pole pieces, the plurality of coils being grouped into a plurality of stator sets and phase groups, said method comprising the steps of:
(i) providing a source of electrical power;
(j) generating a vehicle condition parameter signal representative of a vehicle condition parameter;
(k) determining the value of the vehicle condition parameter signal;
(l) generating a plurality of power control signals from the value of the vehicle condition parameter signal; and
(m) applying the plurality of power control signals to phase groups of selective ones of the stator coil sets to optimize power drain from the source of electrical power in accordance with the value of the vehicle condition parameter signal.

12. The method of claim 11 wherein the vehicle condition parameter signal is representative of current vehicle speed.

13. The method of claim 11 wherein the vehicle condition parameter signal is representative of the existing load on the disk motor.

14. The method of claim 11 further including the steps of:
(n) generating an electrical signal representative of desired vehicle speed;
(o) determining the value of the desired vehicle speed signal; and
(p) using the value of the desired vehicle speed signal in said steps (d) of generating and (e) of applying so that the individual sets of stator coils are selectively activated to optimize power drain from the source of electrical power in accordance with the value of the vehicle condition parameter signal and the electrical desired vehicle speed signal.

15. The method of claim 14 wherein the vehicle condition parameter signal is representative of current vehicle speed.

16. The method of claim 11 wherein the disk motor includes a pair of stator assemblies positioned in flanking relation to the rotor disk, each of the stator assemblies having a mounting plate with a peripheral edge, a plurality of pole pieces distributed on the mounting plate along a plurality of essentially circular substantially concentric paths located inwardly of the peripheral edge of the mounting plate, and a plurality of coils each arranged about a corresponding one of the plurality of pole pieces, the plurality of coils being grouped into a plurality of stator sets and phase groups; and wherein said step (e) of applying is performed on phase groups of selective ones of the stator coil sets of both stator assemblies.

* * * * *